Jan. 3, 1956    R. HEIDECKE    2,729,153
STEREOSCOPIC CAMERA
Filed May 18, 1953    3 Sheets-Sheet 1

Reinhold Heidecke
Inventor
By Charles Shepard
Attorney.

Jan. 3, 1956

R. HEIDECKE 2,729,153

STEREOSCOPIC CAMERA

Filed May 18, 1953

Reinhold Heidecke
Inventor

By Charles Shepard
Attorney

Jan. 3, 1956  R. HEIDECKE  2,729,153
STEREOSCOPIC CAMERA
Filed May 18, 1953  3 Sheets-Sheet 3

Reinhold Heidecke
Inventor

By Charles Shepard
Attorney

United States Patent Office 2,729,153
Patented Jan. 3, 1956

2,729,153

STEREOSCOPIC CAMERA

Reinhold Heidecke, Braunschweig, Germany, assignor to Franke & Heidecke, Fabrik Photographischer Präzisions-Apparate, Braunschweig, Germany, a firm of Germany Application May 18, 1953, Serial No. 355,485

Claims priority, application Germany May 19, 1952

7 Claims. (Cl. 95—18)

This invention relates to a stereoscopic camera for taking companion pairs of stereoscopic pictures which, when properly placed and viewed so that one picture is seen only by one eye or the beholder and the other picture is seen only by the other eye of the beholder, will produce in a beholder having normal binocular vision a three-dimensional sensation of depth, as though the beholder were viewing the actual scene itself rather than merely pictures thereof. More especially, the invention relates to that type of stereoscopic camera in which the distance between the photographic film and the photographic lenses or objectives is varied for the purpose of focusing the camera upon objects at varying distances from the camera.

In stereoscopic cameras there is a lateral outward displacement of the image fields of the two lenses, when the lenses are focused upon objects relatively close to the camera, as compared with the positions of the image fields when the lenses are focused upon objects at infinity or at relatively great distances from the camera. Because of this lateral displacement of the image fields, there is a corresponding loss of the usual picture area if the two taking lenses of the camera are at a fixed distance from each other and if the image field masks in the focal plane of the camera are also at a fixed lateral distance from each other. Such a loss does not occur if the two lenses of the camera are displaced laterally toward each other when focusing upon closer objects, but such displacement of the lenses involves considerable mechanical difficulties in the mounting of the lenses and the mounting of the respective shutters and control mechanism for the shutters.

An object of the present invention is to provide a generally improved and more satisfactory stereoscopic camera.

Another object is the provision of a stereoscopic camera having a pair of lenses at a fixed distance from each other, and having simple and satisfactory means for displacing laterally the masks which define the image fields or picture areas of the film in accordance with and as a result of the focusing of the camera upon objects at different distances.

A further object is the provision of simple mask displacing means operated entirely automatically by the focusing movements of the camera, without requiring any separate manipulation of the image masks, so that regardless of the variable distance between the camera and the object being photographed, the center of the field of view of the camera will always appear at the center of the image field or picture area as defined by the masks at the focal plane of the camera.

These and other desirable objects may be attained in the manner disclosed as an illustrative embodiment of the invention in the following description and in the accompanying drawings forming a part hereof, in which.

The same reference numerals throughout the several views indicate the same parts.

Figure 2:
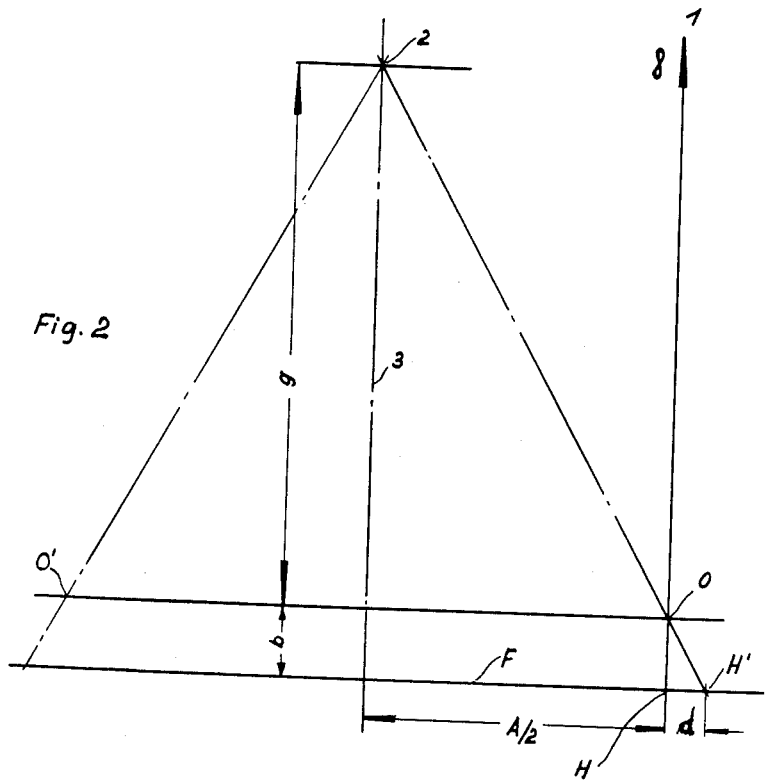
Fig. 2 is a diagram illustrating the geometric principles relating to the displacement of the images.

Referring first to Fig. 2 for a diagrammatic illustration of the principles of the lateral shifting of the image, the line 3 represents the optical axis of the camera, or optical center line thereof, midway between the right hand lens O and the companion left hand lens O'. The distance between the two lenses O and O' may be designated as A, so that the distance from either lens to the center line 3 of the camera is A/2. The distance $b$ is the distance from the lens O to the film F in the focal plane of the camera. The point 1 indicates an object to be photographed at infinity distance on the center line 3.

The image of the point 1 at infinity distance from the camera and on the center line 3 of the camera, will fall at the point H on the film, directly behind the center of the lens O, and at a distance A/2 from the center line 3 of the camera. But if the camera is now focused upon a point 2 lying on the center line or optical axis 3 of the camera and at a relatively close distance $g$ in front of the lens O, the image of this point will no longer lie at H but will lie at the point H', displaced laterally outwardly from the point H by a displacement distance $d$.

Figure 1:
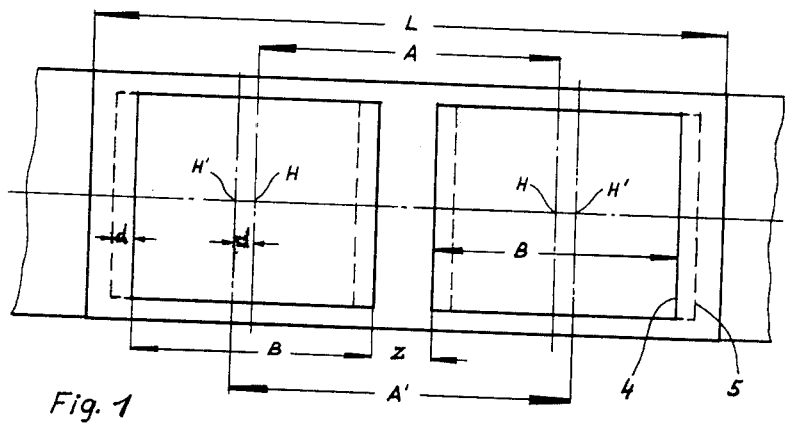
Fig. 1 is a diagrammatic elevational view of a film strip in the focal plane of a camera, illustrating the lateral displacement of the image areas under different conditions of focusing.

Referring now to Fig. 1, the center points of the two image fields of the two companion lenses will be at the two points H, separated from each other by the distance A, when the camera is focused upon objects at infinity distance, but will be at points H', separated from each other by the distance A', when the camera is focused upon objects relatively close to the camera. The outward lateral displacement from the points H to the points H' is indicated by $d$. The distance A' is equal, of course, to A plus 2$d$. The breadth of each image area is indicated at B, the minimum separation between image areas of a companion pair (when the object photographed is at infinity distance) is indicated at Z, and the length of the film strip allowed for the two companion stereoscopic images of one pair is indicated at L. The solid line rectangles 4 indicate the image fields or areas when the camera is focused at infinity, and the dotted rectangles 5 indicate the image fields in their displaced position when the camera is focused upon objects at the closest distance at which the camera is intended to operate.

The extent of displacement of the images, when the camera is focused on an object at any given distance in front of the camera, relative to the position of the image when the camera is focused at infinity position, is indicated by the equation $$d = \frac{Af}{2(g-f)}$$

In this equation, $d$ is the displacement of the image from the infinity-focused position, $g$ is the distance from the lens to the object being photographed, $f$ is the focal length of the lens, and A is the lateral spacing of the two companion lenses from each other. With a lateral lens spacing A of 62 mm., and using lenses with a focal length $f$ of 55 mm., if it is assumed that the closest focusing distance $g$ for which the camera is designed is 500 mm., it is seen from the equation that the image displacement $d$ will be 3.84 mm., or approximately 4 mm.

If the image masks at the focal plane, which define the picture areas on the film, are displaced according to the above equation, when the camera is focused on objects at different distances, then there will be maximum utilization of all parts of the picture area, avoiding the wastage which results when no provision is made for image displacement. When there is no displacement of the masks (with the two lenses at a fixed distance from each other) the margin of one picture area will not correspond to and therefore will not be stereoscopically related to the margin of the other picture area taken by the other lens. Also, the proper displacement of the masks which define the picture areas will greatly assist in accurate cutting of the companion picture areas from the film strip and in easy and accurate mounting of the companion picture areas from the film strip and in easy and accurate mounting of the companion picture areas in the stereoscopic slide or holder.

According to the present invention, the displacement of the masks is accomplished automatically as a result of focusing the camera. Referring now to the embodiment shown in Fig. 3, there is here illustrated somewhat diagrammatically a roll film camera having a casing or body 11, and film spools 12 and 13 at opposite ends of the body. The lens board or lens support 14 carrying the two companion lenses 15 and 16, is arranged to move forwardly and backwardly when focusing the camera, being guided for rectilinear forward and backward movement by suitable guides, as for example the pins 17 stationary in the camera body, engaging with slots 18 in the plate 22 which is secured to the lens board or camera front 14 and moves bodily therewith. The focusing movements are accomplished by a double cam 19 on a shaft 20 journaled in the camera body and turned by a focusing knob 21. As the cam is turned clockwise from the position shown in Fig. 3, one part of the cam pushes forwardly on a portion 22a of the plate 22, and another part of the cam releases the rearward pressure on the part 22b of the plate, to allow the plate to move forwardly.

The angular extensions or brackets 23 and 24 on the plate 22 are provided with oblique slots 25 and 26, which respectively receive pins 27 and 28 fixed to brackets 29 and 30 extending forwardly from the image area masks 31 and 32 which lie just in front of the film 35. These masks 31 and 32 also have guide pins 34 which engage in slots 33 in the fixed parts of the camera body, to guide the masks 31 and 32 in their lateral movements toward and away from each other, parallel to the focal plane of the camera, which is the plane of film 35. The pressure plate 36, urged forwardly by the springs 37 on the camera back, serves to hold the film 35 flat against the rear faces of the picture masks 31 and 32.

Figure 3:
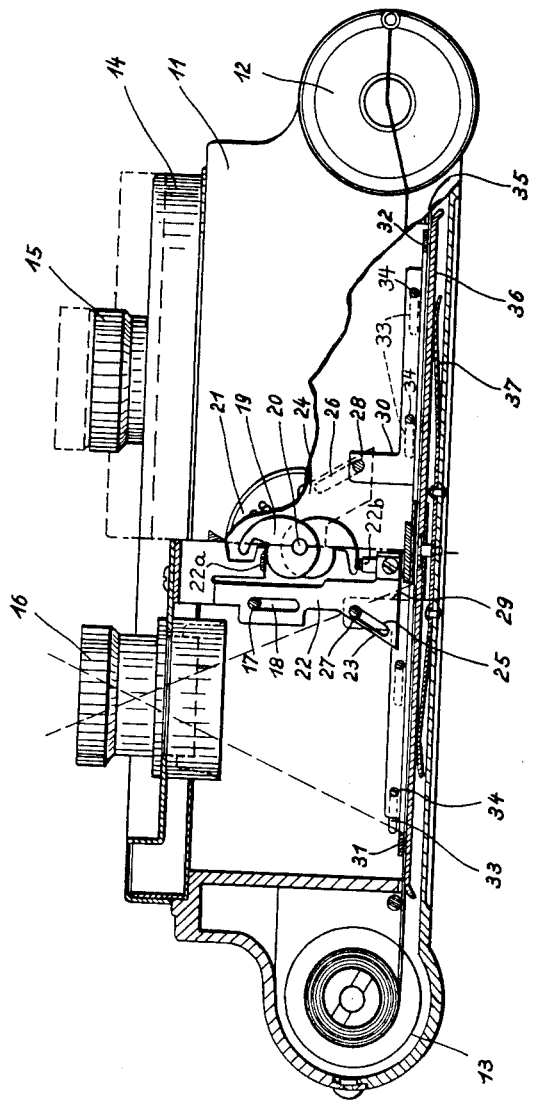
Fig. 3 is a view partly in plan and partly in horizontal section of one form of roll film camera, in accordance with the present invention.

In the left half of Fig. 3 the parts are shown in the position assumed when the camera is focused for infinity, with the lenses 15 and 16 and the lens board 14 retracted to the rearward limit of motion. The masks 31 and 32 are now at the inward limits of their lateral motion, closest to each other, with the center of each mask directly behind the center of its corresponding lens. As the focusing knob 21 is turned to move the lens board 14 and the lenses 15 and 16 further forwardly, to focus upon objects closer to the camera, the forward motion of the parts 22, 23, and 24 causes the inclined cam slots 25 and 26 to force the pins 27 and 28 laterally away from each other, thus carrying the masks 31 and 32 laterally away from each other in accordance with the lateral displacement of the images which occurs in the manner above explained in connection with Fig. 2. In the right hand half of Fig. 3, the mask 32 is shown in the position of its maximum outward displacement, and the dotted line representation of the parts 14, 15, 24, and 26, in this right hand half of Fig. 3, likewise corresponds to the maximum forward displacement of these parts, when the camera is focused for the nearest object within the range of the camera.

The shape and inclination of the cam slots 25 and 26 is such that the lateral outward displacement of the masks is correlated with the distance from the camera to the object on which it is being focused, in the manner indicated by the equation given above. Thus at all times, regardless of focusing adjustment to focus the camera upon objects at different distances, the image masks 31 and 32 will always define a pair of companion picture areas on the film which are stereoscopically related to each other and in which the image of a point on the central axis of the camera and at the distance for which the camera is focused, will fall in the center of the picture areas defined by the masks 31 and 32.

Figure 4:
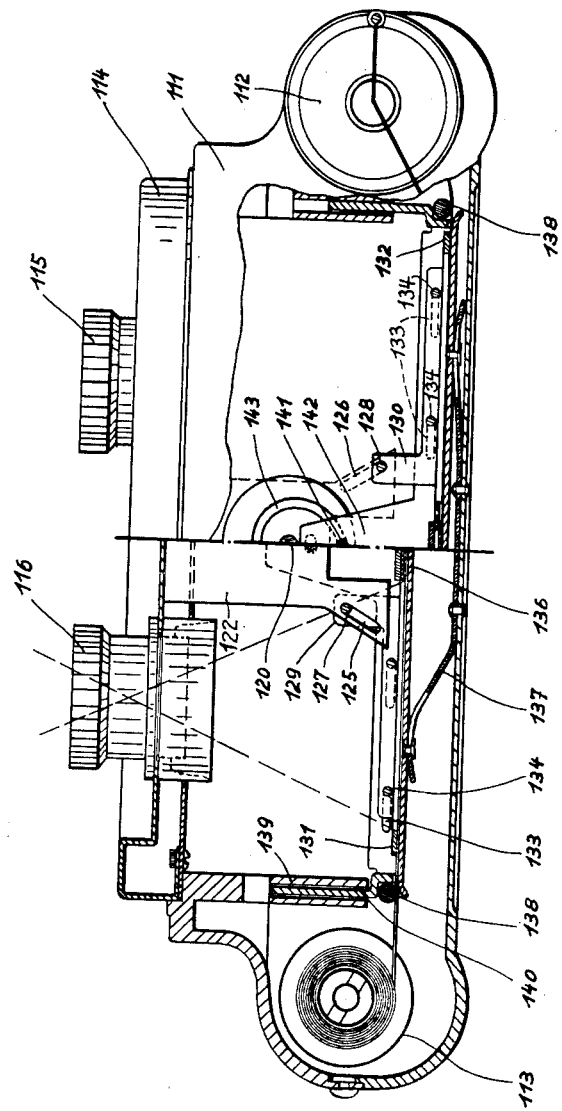
Fig. 4 is a similar view of another form of roll film camera in accordance with the present invention.

In Fig. 4 of the drawings there is shown another embodiment of the invention, in connection with a camera in which the lenses themselves are stationary relative to the camera casing or body, and in which focusing is accomplished by moving the focal plane support forwardly and backwardly relative to the body. Except for this change in making the focal plane support movable for focusing instead of making the lenses movable for focusing, the construction is otherwise substantially the same as above described, and the various parts in Fig. 4 are indicated by the same reference numerals used for the corresponding parts in Fig. 3, with the addition of 100 to each numeral. Thus the lens board 14 and lenses 15 and 16 in Fig. 3 are now marked as 114, 115, and 116, respectively, in Fig. 4. The focal plane structure, including the film guide rollers 138, is mounted on guide slides 140 which slide in guideway slots 139 of the camera case or body, forwardly and backwardly, when the focusing knob on the focus adjustment shaft 120 is turned so that the focusing cam slot 143 acts on the pin 141 fixed to an arm 142 on the focal plane structure, to move the focal plane structure forwardly or backwardly, as the case may be, for focusing.

As before, the image masks 131 and 132 have their guide pins 134 engaged in lateral slots 133 in the focal plane support structure, and have their operating pins 127 and 128 engaged in the inclined slots 125 and 126 in the plate 122, which is stationary with respect to the camera body and the lens board 114. Thus when the focal plane support is moved forwardly to its position closest to the lenses 115 and 116, to focus the camera for infinity, the mask operating pins 127 and 128 will lie at the forward ends of the cam slots 125 and 126, as seen in the left hand half of Fig. 4, and the masks will be moved to their maximum extent toward each other and toward the center line of the camera. When the focus of the camera is changed to focus it upon objects closer to the camera, the focal plane support structure moves rearwardly, carrying the masks rearwardly with it, so that the operating pins 127 and 128 slide rearwardly along the slots 125 and 126, displacing the masks laterally away from each other until finally at the extreme rearward limit of motion of the focal plane support structure (when the camera is focused upon the closest object for which the camera is intended) the masks will be at their extreme outward displacement, farthest from the center line of the camera, in the position indicated in the right hand half of Fig. 4.

The other parts of this structure shown in Fig. 4, being substantially the same as the corresponding parts in Fig. 3, require no further description.

In both forms of the invention, the lateral displacement of the masks is accomplished entirely automatically from the mere focusing of the camera, thus eliminating the extra operation and uncertainty inherent in separate manual adjustment of the masks as suggested in German Patent 607,572 to Bettge.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A stereoscopic camera including a front wall, a pair of lenses mounted on said front wall in side by side relation to each other and at an invariable distance from each other, a film support for holding film behind the lenses in the focal planes thereof, said support and said front wall being mounted for relative movement toward and away from each other for varying the distance between said support and said lenses to focus the camera upon objects at variable distances from the camera, a pair of masks behind said lenses and substantially against the front face of the film held in said support, to define the picture area of the film exposed to light entering the camera through said lenses, said masks being slidably mounted for lateral movement toward and away from each other in directions parallel to the front face of the film, a member projecting rearwardly from said front wall in fixed relation thereto, said member having a pair of inclined cam slots therein diverging from each other in a rearward direction and converging toward each other in a forward direction, and a portion on each of said masks engaging in one of said cam slots and moving along its associated cam slot in accordance with relative movement of said front wall and said film support toward or away from each other, to slide said masks laterally toward each other when said front wall and said film support are brought closer to each other for focusing upon a more distant object and to slide said masks laterally away from each other when said front wall and said film support are separated farther from each other for focusing upon a closer object.

2. A construction as defined in claim 1, in which said masks define picture areas having their centers directly behind the centers of the respective lenses when said lenses and film holder are in infinity-focused position relative to each other, and in which said cam slots are so shaped that when said front wall and said film holder are moved farther from each other to focus the camera upon objects closer than infinity, each of said masks will be laterally displaced outwardly from its infinity-focused position substantially by the amount indicated by the following equation:

$$d = \frac{Af}{2(g-f)}$$

in which $d$ is the amount of lateral displacement of each mask from its infinity-focused position, $A$ is the lateral separation of the centers of the two masks from each other in their infinity-focused positions, $f$ is the focal length of each lens, and $g$ is the distance from each lens forwardly to the object upon which the camera is focused.

3. A stereoscopic camera including a body, a front wall element, a film support element, one of said elements being in normally fixed position relative to said body and the other of said elements being mounted for backward and forward movement relative to said body for varying the spacing between said elements to focus the camera upon objects at different distances, a pair of lenses mounted side by side in fixed positions on said front wall element, a pair of picture-area-defining masks mounted in said body for lateral sliding movement toward and away from each other in directions parallel to said film support element, said masks remaining at a fixed distance from said support element while said support element and said front wall element move toward and away from each other during focusing of the camera, a cam follower pin operatively connected to each of said masks, means fixed to and projecting rearwardly from said front wall element and extending to the vicinity of said masks, and two cam slots in said means, one of said cam slots engaging the pin of one mask and the other cam slot engaging the pin of the other mask, said cam slots being shaped to draw said masks laterally toward each other as said front wall element and film support element move closer to each other and to shift said masks laterally away from each other as said front wall element and film support element move farther from each other.

4. A stereoscopic camera comprising a camera body, two lenses arranged side by side at a fixed spacing from each other, a support for holding a single light-sensitive element behind both lenses in position to receive images formed by both lenses, said lenses and support being mounted on said body for relative movement in an axial direction toward and away from each other for focusing, two image masks in front of said support for limiting the lateral extent of the respective images formed on the light-sensitive element by the two lenses, means mounting said masks for lateral movement toward and away from each other, focus adjusting means for causing relative axial movement of said lenses and support, and mask shifting means coupled with and operated by said focus adjusting means for shifting said masks laterally closer to each other when said focus adjusting means is moved to focus the camera upon a more distant object and for shifting said masks laterally farther from each other when said focus adjusting means is moved to focus the camera upon a closer object.

5. A construction as defined in claim 4, in which said mask shifting means is so formed and proportioned that the image of a point on the axis of the camera at any distance for which the camera is focused, will remain in fixed relation to each of said image masks.

6. A construction as defined in claim 4, in which said support is stationary in the camera body during normal focusing and said two lenses are mounted for axial movement relative to the body for focusing, and in which said focus adjusting means includes a rotary focusing knob and a cam turned by said knob for moving said lenses axially, and in which said means for shifting said masks laterally includes cam means operated by axial movement of said lenses.

7. A construction as defined in claim 4, in which said lenses are stationary relative to said camera body during normal focusing and said support is mounted for axial movement relative to the body for focusing, and in which said focus adjusting means includes a rotary focusing knob and a cam turned by said knob for moving said support axially, and in which said image masks are mounted to move axially with said support and said means for shifting said masks includes a cam mounted on said body and engaging a cam follower secured to one of said image masks.

References Cited in the file of this patent
UNITED STATES PATENTS
1,515,428     Bouin _____ Nov. 11, 1924